April 8, 1924.
M. R. KARGE
1,489,439
FLEXIBLE POWER TRANSMITTING ELEMENT OR COUPLING
Filed June 23, 1920
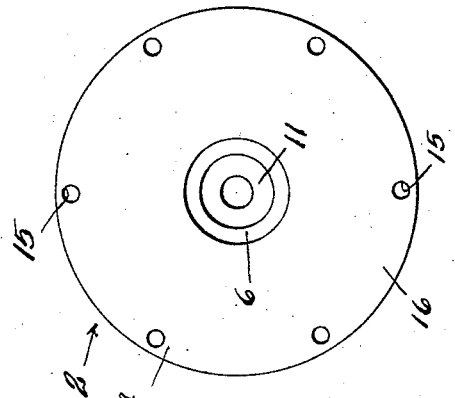
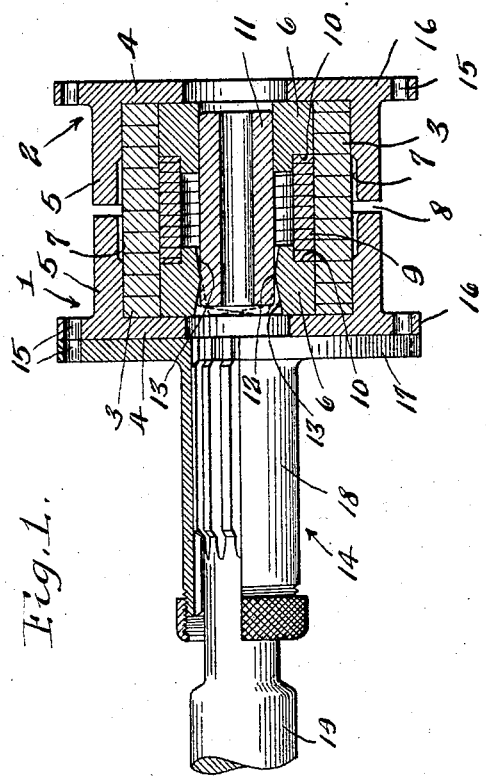
INVENTOR.
BY
ATTORNEYS.

Patented Apr. 8, 1924.

1,489,439

UNITED STATES PATENT OFFICE.

MAXWELL R. KARGE, OF PHOENIX, NEW YORK, ASSIGNOR, BY MESNE ASSIGNMENTS, TO CHARLES J. DECKOP, OF BUFFALO, NEW YORK.

FLEXIBLE POWER-TRANSMITTING ELEMENT OR COUPLING.

Application filed June 23, 1920. Serial No. 391,068.

*To all whom it may concern:*

Be it known that I, MAXWELL R. KARGE, a citizen of the United States, and a resident of Phoenix, in the county of Oswego and State of New York, have invented a certain new and useful Flexible Power-Transmitting Element or Coupling, of which the following is a specification.

This invention relates to flexible power transmitting elements or cushion couplings of the type set forth in my pending application, Sr. No. 285,762, filed March 28, 1919, and Sr. No. 391,067 filed June 23, 1920 and has for its object a coupling especially applicable for use as a universal joint in motor vehicles, which is particularly simple and compact in construction and highly efficient and durable in use.

In describing this invention, reference is had to the accompanying drawings in which like characters designate corresponding parts in all the views.

Figure 1 is a longitudinal sectional view of a preferable form of my universal joint.

Figure 2 is an end view thereof.

This flexible power transmitting element or universal joint comprises opposing sections, a coiled torsion spring fixed at its ends to the sections, and means connecting the sections to balance and center the same. In this form of my invention, said means is rigid with one section and has a universal joint connection with the other section.

1 and 2 are the opposing sections connected respectively to the shafts coupled together, and 3 is the coiled torsion spring having its end coils fixed to the sections. Each section 1 or 2, as here illustrated, comprises a head 4 having an annular flange or sleeve extension 5 and a central ring or plug 6 within and spaced from the sleeve extension, or the inner end portion thereof, and together therewith forming an annular recess in which the end coils of the spring 3 are held. The sleeve extensions are shrunk on the end coils of the spring and the rings or plugs forced into the end coils so that said end coils are securely and rigidly fixed to the heads to transmit motion to and from said heads.

The flanges or sleeve extensions 5 enclose the spring. Said flanges are spaced apart at their ends sufficient distance to permit a normal universal joint action to take place between the sections 1, 2. The inner faces of the outer end portions of the flanges or sleeves 5 are cut away at 7 to form spaces for the intermediate coils of the spring 3 to expand when torque is applied thereto in one direction, the surfaces 7 limiting the expansion of the spring and causing the spring to bind thereon and hence prevent undue strain on the spring. Also, the ends of the flanges or sleeves are spaced apart less distance at 8 than the width of one coil of the spring to prevent the coil opposite the space 8, between the ends of the flanges, from bulging out through such space 8 and becoming wedged therein, or unduly strained or broken. The coils of the spring are preferably rectangular in cross section and spaced apart but close enough together to bind friction plate or disk fashion on each other to prevent undue strain and breakage when a predetermined amount of torque is applied thereto. Also, means is provided within the intermediate coils of the spring on which it contracts and binds when a predetermined amount of torque is applied thereto, said means being here shown as a sleeve 9 having its ends located in rabbets 10 formed in opposing ends of the plugs 6. The sleeve is here shown as composed of coils, that is, it is a cylinder slotted spirally, although it is not necessarily a spring.

The means connecting the sections 1, 2 and rigid with one section and having a universal joint connection with the other section, in this embodiment of my invention, comprises a madrel 11 having a drive fit within the bore of one plug as the plug 6 of the section 2 and fulcrumed in the bore of the plug 6 of the section 1 to have a universal joint action. As here illustrated, the plug 6 of the section 1 is formed with an internal annular fulcrum 12 provided by tapering the bore of the plug inwardly at 13 from opposite ends of the plug, the annular apex provided by these tapers forming the fulcrum 12. Thus, during rocking of one section 1 or 2 relatively to the other when such sections are being rotated to translate power, the mandrel 11 remains rigid with the section 2 and either fulcrums on the section 1 or the section 1 fulcrums on it.

The sections 1, 2 are connected to driven and driving elements or shafts in any suitable maner; and a driven element 14 is shown as attached to the head of the section 1 as by bolts passing through alined holes 15 in the flanges 16, 17 on the head and on the driven element. The driven element here shown, comprises a hollow shaft 18 in which a shaft section 19 slides endwise.

The construction and operation of the universal joint is readily understandable from the foregoing description and accompanying drawing.

What I claim is:

1. A flexible power transmitting element comprising opposing sections, each comprising a head provided with an axial opening, a coiled spring connecting the heads and having its end coils rigidly secured respectively to the heads, and a mandrel located in the axial openings of the heads, the mandrel being substantially rigid with one head and being mounted within the bore of the other head and within the coils rigidly secured to such head to have a universal action, substantially as and for the purpose described.

2. A flexible power transmitting element comprising opposing sections, each comprising a head provided with an axial opening, a coiled spring connecting the heads and having its end coils secured respectively to the heads, and a mandrel located in the axial openings of the heads, the mandrel being substantially rigid with one head and being mounted within the bore of the other head and within the coils of the spring secured to such head, to have a universal action, the walls of the bore of the latter head being conical from the ends of the bore toward the central part of the bore forming an annular apex for engaging the periphery of the mandrel, substantially as and for the purpose specified.

3. A flexible power transmitting element comprising opposing sections each comprising a head formed with an annular flange or sleeve extension on its side opposed to the other section, and an annular plug concentric with and located within the flange or sleeve extension and together therewith, a coiled spring having its end coils located in said recesses between the flanges and the plugs, and a mandrel located in the bores of the plugs, substantially as and for the purpose specified.

4. A flexible power transmitting element comprising opposing sections each comprising a head formed with an annular flange or sleeve extension on its side opposed to the other section, and an annular plug concentric with and located within the flange or sleeve extension and together therewith forming an annular recess, a coiled spring having its end coils located in said recesses between the flanges and the plugs, and a mandrel located in the bores of the plugs, and filling the bore of one plug to be rigid therewith and being fulcrumed in the bore of the other plug to have a universal joint action, substantially as and for the purpose set forth.

In testimony whereof, I have hereunto signed my name, at Phoenix, in the county of Oswego, and State of New York, this 19th day of April, 1920.

MAXWELL R. KARGE.